May 27, 1969 — W. S. SUTOWSKI — 3,446,537

WHEEL

Filed Feb. 14, 1968

INVENTOR
WALTER S. SUTOWSKI

BY
ATTORNEYS.

United States Patent Office 3,446,537
Patented May 27, 1969

3,446,537
WHEEL
Walter S. Sutowski, 6976 Crestview Drive,
Brecksville, Ohio 44141
Continuation-in-part of application Ser. No. 618,803,
Feb. 27, 1967. This application Feb. 14, 1968, Ser.
No. 705,386
Int. Cl. B60b *37/00, 1/06;* F16c *33/00*
U.S. Cl. 301—1                                      8 Claims

ABSTRACT OF THE DISCLOSURE

A wheel for a vehicle, the wheel having two disk members secured together in axial alignment, the disk members being spaced apart axially at the hub to accommodate a bearing assembly thereon, the bearing assembly including a split cylindrical metal outer race member embraced at opposite axial ends by inner edge portions of the disk members formed to tightly embraced the axial ends of the outer race member to receive axial thrust and to tightly embrace the outer cylindrical wall of the outer race member adjacent said opposite ends to close the split in the outer race member and to receive radial thrust, the inner wall of the outer race member having two axially spaced grooves therein providing the outer raceways for two sets, respectively, of ball bearings, a bolt having on the outer wall thereof two axially spaced grooves therein providing the inner raceways for said two sets of ball bearings, respectively, the inner end of the bolt being threaded to be threadably engaged in the threaded opening of a hanger or bracket, the outer end of the bolt extending through an opening in the adjacent disk member and having a non-circular wrench-engaging head exposed there for conveniently rotating the bolt on its axis to threadably engage and disengage the threaded inner end of the bolt from the hanger or bracket.

Relationship to other cases

This application is a continuation-in-part of application Ser. No. 618,803 filed by the applicant on Feb. 27, 1967.

An object of my invention is to provide an economical and readily fabricated metal wheel for lawn mowers, small tractors and vehicles, and the like. A particular object is to provide the axial and bearing assembly for a metal wheel which is readily engaged to the hanger or wheel supporting bracket of a vehicle, such as a mower, and so constructed as to facilitate the mounting of the wheel to the hanger or bracket from the outer side of the vehicle without access to the inner side of the hanger or bracket.

In many installations, it is desired to have the stud axle of a wheel mounted directly to a threaded hole in the hanger or wheel supporting bracket and to be able to mount or demount the axle therefrom entirely from the outer side of the vehicle. Sometimes the inner side of the hanger or bracket is inaccessible or inconvenient for either a nut at that location or for engaging the axle at such location. The construction of the wheel, including the wheel and bearing assembly herein disclosed, greatly facilitates the mounting and demounting of the wheel in such instances.

Other objects and a fuller understanding of my invention may be had by referring to the accompanying drawing in which.

Figure 1:
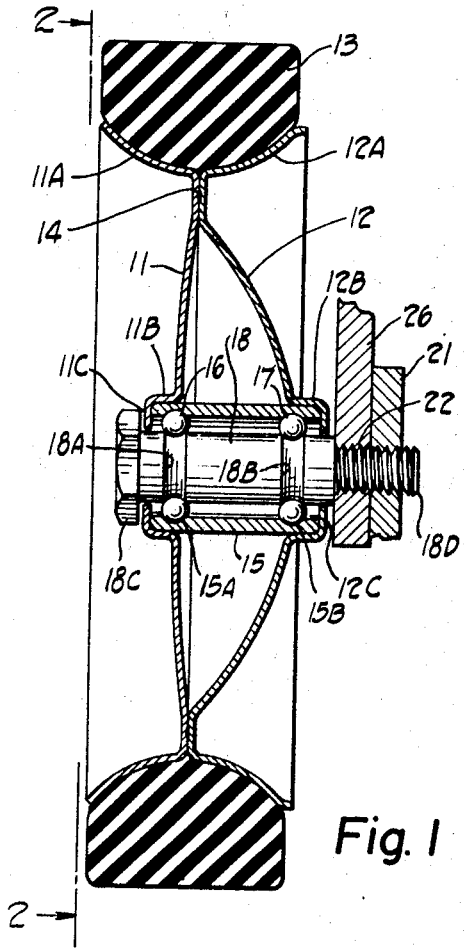
FIGURE 1 is a sectional view through a wheel, bearing my improved axle and bearing assembly in the hub thereof.

A preferred form of my wheel, as illustrated in the drawing, is made up of an outer metal disk 11 and an inner metal disk 12, secured together in axial alignment such as by welding 14 in the usual manner. The disks have complementary rim portions 11A and 11B which together accommodate a solid rubber tire 13 therein. There is a central opening extending through the wheel including both the disks 11 and 12.

At the hub of the wheel, the disk 11 is formed to have a cylindrical hub portion 11B and similarly the disk 12 is formed to provide the cylindrical hub portion 12B. The disk 11 at the central opening therein has an inner edge portion 11C bent inwardly and disposed in a plane normal to the axis of the wheel. Similarly, the disk 12 adjacent to the central opening thereof has an edge portion 12C bent inwardly and disposed in a plane normal to the axis of the wheel.

Mounted within the wheel and inserted in the hub prior to the assembly and securement of the two disks together is a cylindrical metal outer race member 15. This race member 15 is split and is resiliently biased to a partially open position but is also resiliently compressible to a complete cylindrical form. The opposite axial ends of the outer race member 15 are embraced by and held against axial thrust by the edge portions 11C and 12C of the disks, respectively. The outer wall of the outer race member 15 adjacent to opposite ends is embraced by the hub portion 11B at one end and the hub portion 12B at the other end so as to retain the race member against radial thrust.

The inner wall of the outer race member 15 is provided with an annular groove 15A adjacent one end and an annular groove 15B adjacent the other end, the grooves being in spaced parallel planes normal to the axis of the outer race member 15.

Extending through the central opening of the wheel and concentrically within the outer race member 15, there is a stud bolt 18. This bolt 18 has an inner threaded end 18D and an outer head 18C of hexagonal form adapted to be seized by a wrench for rotating the bolt on its axis. The head 18C overlaps the edge portion 11C of the disk 11 so as to close the gap between the shank of the bolt and the inner edge of the disk 11 at the central opening therethrough.

It is to be noted that the shank of the bolt 18 is substantially of the same diameter from the head 18C to the threaded end portion 18D and that this shank of uniform diameter extends through the central opening in the wheel, that is, through the openings in both the disks 11 and 12. These openings in disks 11 and 12 are also of uniform internal diameter and the clearance between the bolt and the inner edge of the openings in disks 11 and 12 is a close sliding fit.

The bolt 18 is provided with annular groove 18A adjacent its outer end, and an annular groove 18B adjacent its inner end; these grooves are formed in the shank of the bolt having uniform diameter. Groove 18A complements groove 15A in the outer race member, and groove 18B complements the groove 15B in the outer race member.

Positioned in the grooves adjacent the outer end of the bolt is a circle of ball bearings 16 and positioned in the opposite grooves adjacent to the inner end of the bolt is a circle of ball bearings 17. Thus, the cylindrical outer race member 15 and the bolt 18 together provide two axially spaced ball raceways. One of these raceways is in alignment with the major portion or web of disk 11 and the other raceway is in the plane of the major portion or web of the disk 12. Thus, the radial thrust on the disks 11 and 12 is in alignment with the respective raceways containing the two circles of ball bearings.

The mower or vehicle to which the wheel is to be secured has a hanger or wheel supporting bracket shown fragmentarily in FIGURE 1. Welded to this is a reinforcing strip 21 so that portions 20 and 21 together provide a supporting member for the axle provided by bolt 18. This supporting member made up of parts 20 and 21 is provided with an internally threaded opening 22 which threadably engages with the threaded end 18D of bolt 18.

It is thus seen that means are provided whereby the wheel may be mounted to a hanger or supporting bracket from the outside of the vehicle, that is, on the side of the disk 11. The head 18C may be turned to threadably engage and disengage the bolt 18 from the supporting bracket without need for access to the inner end of the bolt 18. There is no need for using two wrenches simultaneously to engage or disengage the bolt 18 and the rotation of the bolt may be obtained entirely from the outer side of the wheel. There is no danger of the bolt being threaded down too tightly as the bolt may be relatively stationery and the outer race member 15 carrying the wheel thereof may freely revolve about the bolt. The outer race member 15 prevents the two disks 11 and 12 at the hub thereof from being drawn together in an axial direction upon the tightening down of the bolt to the supporting bracket.

Figure 2:
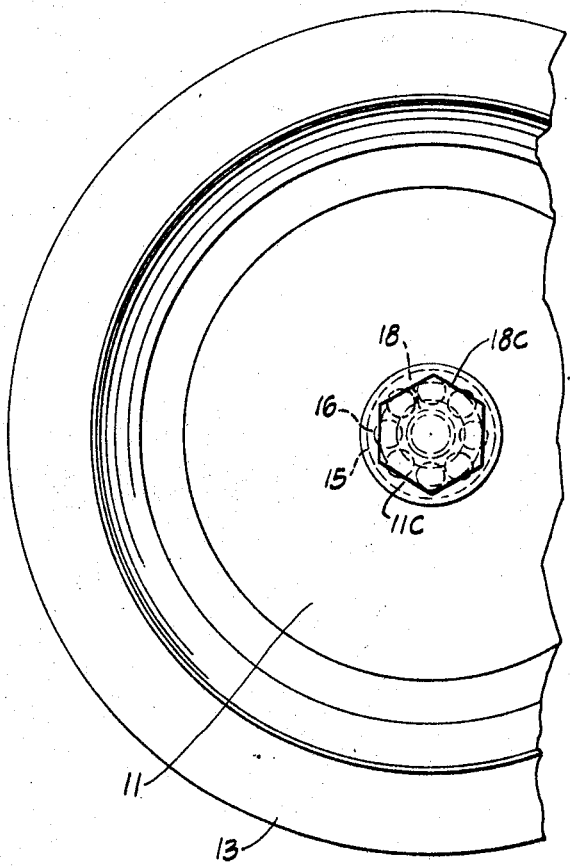
FIGURE 2 is an endwise view looking in the direction of the arrows 2—2 of FIGURE 1.
Figure 3:
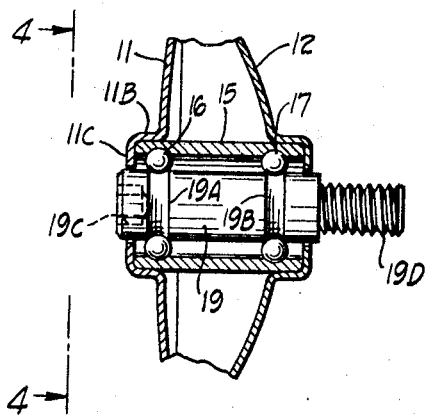
FIGURE 3 is a sectional view of a wheel and axle and bearing assembly in which a modified form of axle is utilized.
Figure 4:
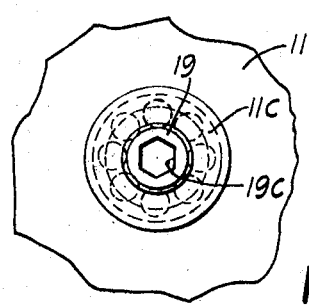
FIGURE 4 is a fragmentary endwise view looking in the direction of the arrows 4—4 of FIGURE 3.

The modification of the bolt is illustrated in FIGURES 3 and 4. The outer race member, the balls, and the disks making up the wheel are the same as that described in connection with FIGURES 1 and 2. In the modification of FIGURES 3 and 4, instead of having a head 18C formed on the outer end of the bolt, there is a socket extending axially into the bolt.

In the modified form, the bolt is designated by the reference character 19. The grooves 19A and 19B are similar to the grooves 18A and 18B of the bolt 18. Similarly, the inner threaded end 19D is the same as the inner threaded end 18D of bolt 18 and is secured to a hanger or bracket in the same manner. The wrench-engaging outer end of the bolt being of socket form is designated by the reference character 19C. This socket 19C is non-circular, as for example hexagonal, across sections adapted to interfit with a wrenching tool such as an Allen wrench.

Again, in the modification of FIGURE 3, provision is made for rotating the bolt or its axis entirely from the outer side of the wheel so that there is no need for access to the inner threaded end. This greatly facilitates the mounting and demounting of the wheel to a hanger or supporting bracket of a tractor, mower, or the like.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

What is claimed is:

1. A wheel for mounting to a hanger or bracket of a vehicle, the hanger or bracket having a threaded hole therein, said wheel comprising a pair of metal disks secured together in axial alignment, the disks having aligned openings at the hub of the wheel, the disks being spaced about axially at said hub, a split metal outer race member of cylindrical form and resiliently compressible to close the split, said outer race member having two axially spaced annular grooves formed therein providing two parallel outer raceways, the inner edge portions of said disks at said hub being formed to extend radially inward of the outer race member at opposite ends of the outer race member to embrace the same therebetween and to receive axial thrust, said disks adjacent said inner edge portion extending axially of the outer cylindrical wall of the outer race member adjacent said opposite ends thereof to embrace the outer race member to close said split and to receive radial thrust, a metal bolt extending through said outer race member and having two axially spaced annular grooves formed thereon for providing two parallel inner raceways complementing the outer raceways of said outer race member, two sets of ball bearings disposed in said axially spaced raceways, respectively, the inner end of said bolt being threaded and extending axially from said wheel to be threadably engaged in said threaded hole of a hanger or bracket, the outer end of said bolt having a non-circular wrench-engaging portion exposed from outwardly of said wheel for the rotation of the bolt on its axis to threadably engage and disengage the bolt from the hanger or bracket.

2. A wheel as claimed in claim 1 and in which the outer end of the bolt has a polygonal head formed thereon for engaging a wrench.

3. A wheel as claimed in claim 1 and in which the outer end of the bolt has an axially extending socket formed therein of non-circular cross-section for receiving a complementary wrenching tool therein.

4. A wheel having a central opening therethrough at the hub of the wheel the wheel having two spaced walls radially outwardly of said hub, the wheel at said hub having axially spaced portions around said opening, an axle and bearing assembly positioned in said hub, said assembly including a cylindrical outer race member, the outer end portion of said outer race member being embraced both axially and radially by said axially spaced portions of the wheel to hold firmly the outer race member both axially and radially in position in said wheel, a metal bolt extending axially of said outer race member, the bolt having a threaded inner end protruding from an inner side of the wheel and adapted to be threadably interengaged with bolt holding means, the bolt having an outer end protruding from an outer side of said wheel through said central opening for engagement with a wrench on said outer side to rotate said bolt on its axis, said outer race member and said bolt having complementary facing grooves at spaced axial locations integrally formed therein and ball bearings positioned in two circles in the two raceways, respectively, formed by said grooves.

5. A wheel as claimed in claim 4, and in which the bolt has a wrench-engaging polygonal head formed thereon at said outer end disposed outwardly of said wheel and overlying said central opening in the wheel.

6. A wheel as claimed in claim 4, and in which said bolt at said outer end has a wrench-engaging axially extending non-circular socket formed therein.

7. A wheel as claimed in claim 4 and in which said axially spaced portions around said opening extend radially inward in close proximity to said bolt and beyond the radial extent of said outer race member and the major portion of the radial extent of said balls, to cover substantially the outer race member and the balls at the opposite sides of the wheel.

8. A wheel as claimed in claim 4 and in which the circles of balls are disposed substantially in the planes of the said spaced walls of the wheel, and said bolt intermediate of said spaced grooves is the same diameter as outwardly of the grooves and at the locations where the bolt protrudes from the opposite sides of the wheel through the central opening in the wheel.

(References on following page)

References Cited

UNITED STATES PATENTS

| | | | |
|---|---|---|---|
| 2,427,430 | 9/1947 | Waldeck | 301—63 X |
| 2,692,801 | 10/1954 | Rosenberg | 301—63 |
| 2,866,672 | 12/1958 | Black | 308—191 |
| 2,935,357 | 5/1960 | Satowski | 301—5 |
| 2,955,884 | 10/1960 | Marshall | 308—190 |
| 3,290,101 | 12/1966 | Recknagel | 308—187.1 X |
| 3,400,990 | 9/1968 | Sato | 308—191 |

RICHARD J. JOHNSON, *Primary Examiner.*

U.S. Cl. X.R.

301—63; 308—191